United States Patent [19]
Decker et al.

[11] 4,423,650
[45] Jan. 3, 1984

[54] MACHINING PROCESS FOR METAL MIRROR SURFACES

[75] Inventors: Donald L. Decker; James O. Porteus, both of Ridgecrest; Darrell J. Grandjean, Inyokern, all of Calif.

[73] Assignee: The United States of America as represented by the Secretary of the Navy, Washington, D.C.

[21] Appl. No.: 303,450

[22] Filed: Sep. 18, 1981

[51] Int. Cl.³ .......................... B23B 1/00; B23B 5/00
[52] U.S. Cl. .................................................. 82/1 C
[58] Field of Search ................... 76/101 R, DIG. 12; 82/1 C, 12, 18; 407/119, 120

[56] References Cited

U.S. PATENT DOCUMENTS

| | | | |
|---|---|---|---|
| 1,899,608 | 2/1933 | Bullard | 82/1 C |
| 3,835,528 | 9/1974 | Garrett | 82/12 |
| 3,955,448 | 5/1976 | Mundy | 407/119 |
| 4,181,049 | 1/1980 | Borisenko | 82/1 C |
| 4,312,250 | 1/1982 | Yankoff | 82/1 C |
| 4,318,318 | 3/1982 | Schott | 82/1 C |
| 4,333,368 | 6/1982 | Watt | 82/1 C |
| 4,359,916 | 11/1982 | Pegov | 82/1 C |

Primary Examiner—E. R. Kazenske
Assistant Examiner—Paul M. Heyrana, Sr.
Attorney, Agent, or Firm—R. F. Beers; W. Thom. Skeer; Kenneth G. Pritchard

[57] ABSTRACT

A method of producing uniform metal mirror surfaces which are harder than the starting material. A three step machining process produces uniform metal mirror surfaces without polishing defects or lack of spatial uniformity from previous polishing methods. The surface is first machined in the normal manner for diamond turning. The second machining process requires the rake angle to be made negative to the extent of approximately 30°. This machining process creates plastic deformation in the surface material. The final step requires machining material in the top rake angle of from −5° to +5° which provides the uniform surface of regular diamond machining. An alternate method only needs a single cut at an intermediate rake angle.

1 Claim, 1 Drawing Figure

MACHINING PROCESS FOR METAL MIRROR SURFACES

BACKGROUND OF THE INVENTION

1. Field of the Invention

This invention pertains to a method for producing high quality metal mirror surfaces. In particular, this method pertains to hardened metal surfaces suitable for high energy laser mirrors.

2. Description of the Prior Art

Cold working of a metal surface has been practiced for centuries. Such surface treatment as peening, rolling, forging, etc. produce work hardened and smooth surfaces. However, none of these methods produces an accurately finished surface suitable for optical applications. It is possible to produce a hard surface by mechanical polishing using a hard lap and polishing under high pressure. That process is a form of mechanical polishing which produces a surface with generally embedded polishing compound and other types of surface and subsurface damage.

Diamond machining has arisen as a way of producing precision surfaces of higher quality than the typical polished surface. A diamond turned surface has a notable lack of embedded polishing compound and can possess a relatively high crystalline order. While the diamond machining produces a surface with a high laser damage threshold for melting over much of its area, the diamond machining, like the polishing method above, does not produce a spatially uniform surface. The term "diamond machining" used herein refers to single point diamond machining. While ideally a single point should be used, there is finite width and a single edge is used. Further background on this type of optical work can be found in the *Proceedings of the Society of Photo-Optical Instrumentation Engineers,* Vol. 93, *Advances in Precision Machining of Optics,* August 1976, which is incorporated by reference.

The same cutting principles apply to tools using other than single crystal diamonds. The cutting tool can be made of any material with a cutting edge sufficiently sharp enough to substitute for the traditional diamond edge. The need is for a decent crystal edge for cutting on an atomic scale. For current state of the art, diamond is the most practical substance to use.

SUMMARY OF THE INVENTION

Hardened metal surfaces from materials such as copper, silver, gold, aluminum and alloys of these metals can be made by two distinctly different precision diamond machining processes. In the first method, an optically machined surface is prepared initially using customary tool top rake angles in the +5° to −5° range. This surface is then cold worked using a very large negative rake angle in the range of −30°. Upon completion of the machining at this very large negative rake angle, the surface is remachined using a less negative rake angle in the range of −5° to +5°. Alternately, the surface can be produced in one step, using an intermediate negative rake angle, −15° to −20° which produces a large degree of cold work, but also prepares a very high quality optically finished surface at the same time.

An object of the present invention is to produce optically finished, hardened metal surfaces which have spatial uniformity in the degree of hardening and surface finish, and are thus suitable for high energy laser mirrors in that the damage threshold is uniformly high.

DESCRIPTION OF THE PREFERRED EMBODIMENT

Figure 1:
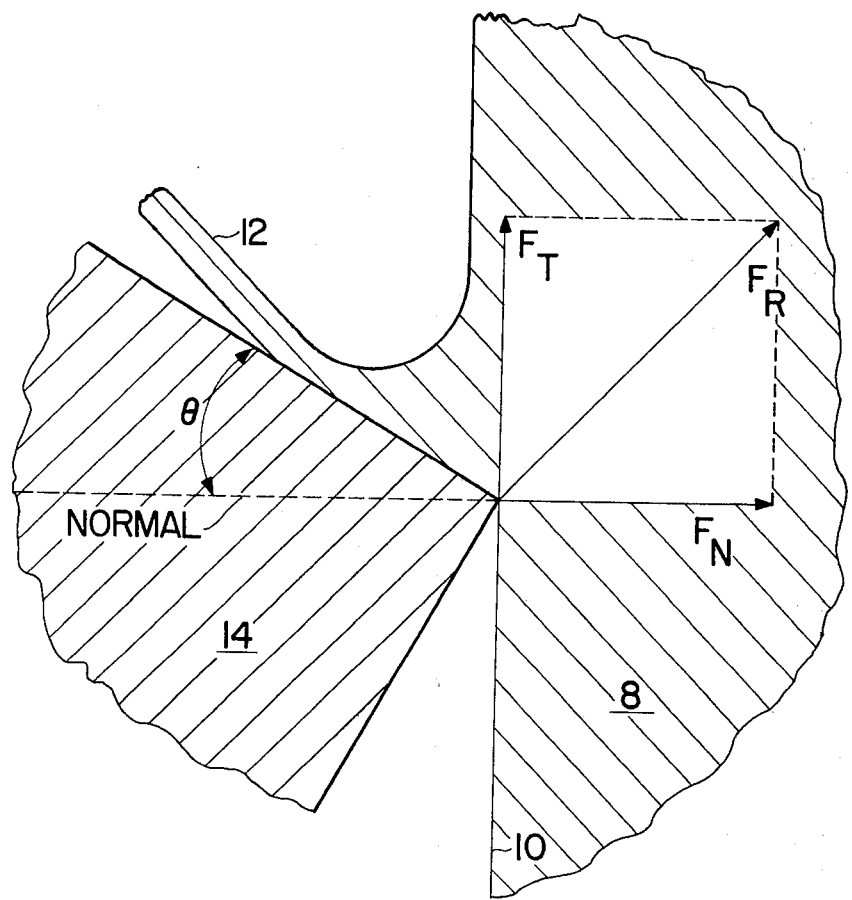
FIG. 1 is a side view of the present method.

FIG. 1 shows a side profile view or sectional view of a metal slab 8 which is a workpiece chosen from the group of materials consisting of copper, silver, gold, aluminum, and alloys of these metals suitable for high energy laser mirrors. A normal to the surface is shown by the dotted line. Arbitrary angle $\theta$ is shown which defines the rake angle of a machining bit. The diamond machining process ordinarily is performed with the top rake angle of the tool 14 at 0° or thereabouts. However in the process herein described a large negative rake angle is the key to the finishing process. Negative or positive rake angle is measured with respect to the normal shown. The rake angle, $\theta$, shown is negative. As the top rake angle is made more negative, the force and pressure which tool 14 exerts on the surface being machined increases. This tool force has two effects: (1) the component parallel to the surface, $F_T$, has a shearing effect as tool 14 moves in the direction shown by $F_T$ and results in tool 14 removing a chip 12 from the surface; and (2) the component perpendicular to the surface, $F_N$, results in compressive loading and possible plastic deformation of the workpiece itself. The resultant force on the workpiece is shown by $F_R$. As the tool angle becomes sufficiently negative the shearing force, $F_T$, becomes too small for tool 14 to produce chip 12.

In this case, normal compressive loading, $F_N$, can be very large and a burnishing effect is produced. The compression loading results in plastic deformation that causes the upper surface layer to both harden and flow, filling cracks, voids, and similar defects in the underlying material.

If the tool is used with a slightly less negative rake, chip 12 is produced as the shearing effect becomes more pronounced. With a low compliance precise diamond turning machine, a precisely figured finished optical surface 10 is produced. The resulting large dislocation concentration results in a surface which is very resistant to plastic deformation. This results in a high laser damage threshold for slip. Since the microscopic voids, grain boundaries, cracks, and other microscopic defects are substantially reduced in concentration as a consequence of the plastic deformation, the amount of spatial uniformity is significantly improved. If another machining step is taken with a much smaller rake angle, −5°, the reduced tool force produces a more accurate final surface figure. The advantages of the hard surface layer created in the compression loading of a large negative rake machining step is preserved as long as the depth of the following cut is small enough not to machine through the hardened layer. The depth of hardening depends on the tool rake angle and the depth of cut. In the alternate machining process, a surface of intermediate hardness can be produced which has had sufficient plastic deformation to close up most defects in the underlying material. By proceeding in this case with a tool rake angle in the −15° range, tool forces are low enough to permit an accurately finished final surface in one step. While the surface is not hardened as much as the first method, sufficient hardening for laser use is produced.

It is obvious to those skilled in the art that numerous modifications can be made.

What is claimed is:

1. A method of producing uniformly hardened metal mirror surfaces with a turning diamond machining bit comprising the steps of:

preparing a given metal surface by diamond turning it with said bit positioned at a top rake angle within the range of −5° to +5°;

machining said metal surface by diamond turning it with said bit positioned at a top rake angle of approximately −30° such that plastic deformations of a predetermined depth occurs in said metal surface due to compression loading with minimal shearing force to form a chip at the metal surface; and remachining said metal surface a third time by diamond turning it with said bit positioned at a top rake angle of approximately 0° such that sufficient shearing force to machine the surface is present so only a portion of said predetermined depth is removed.

* * * * *